July 7, 1953

H. NELSON 2,644,520

LENGTH CUTTING MACHINE

Filed Dec. 9, 1949

INVENTOR
*HARRY NELSON*
BY
HIS ATTORNEYS

INVENTOR.
HARRY NELSON
BY
HIS ATTORNEYS

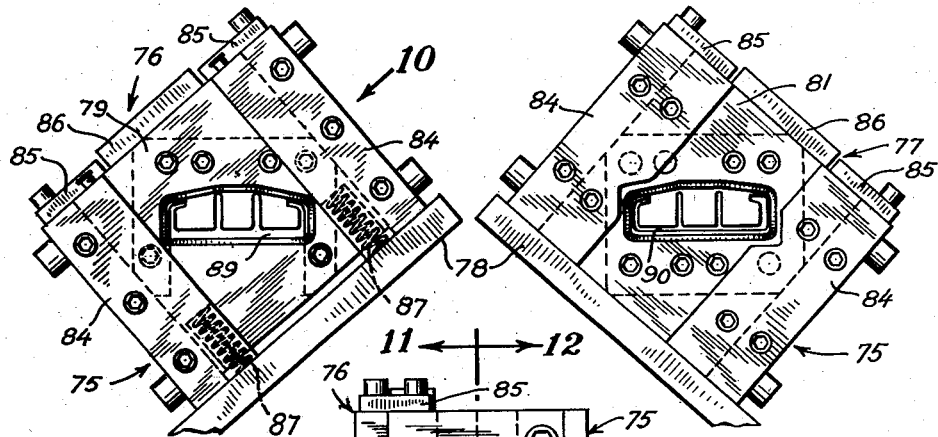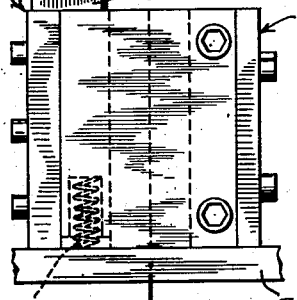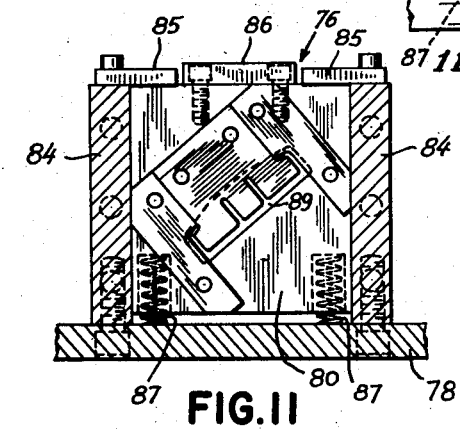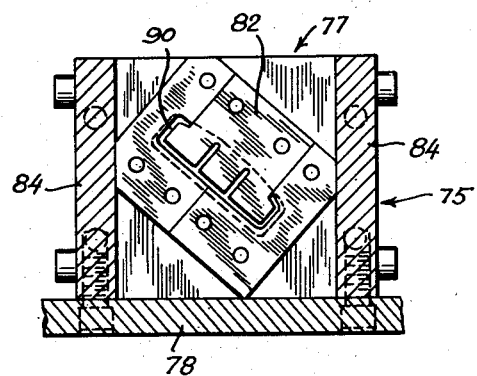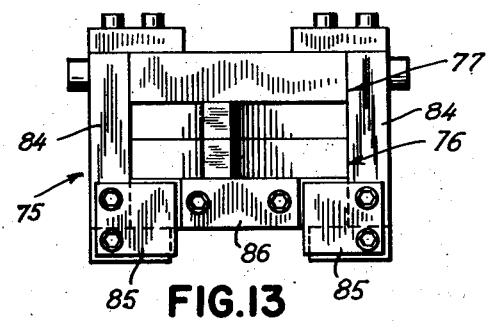

July 7, 1953 H. NELSON 2,644,520
LENGTH CUTTING MACHINE
Filed Dec. 9, 1949 4 Sheets-Sheet 4
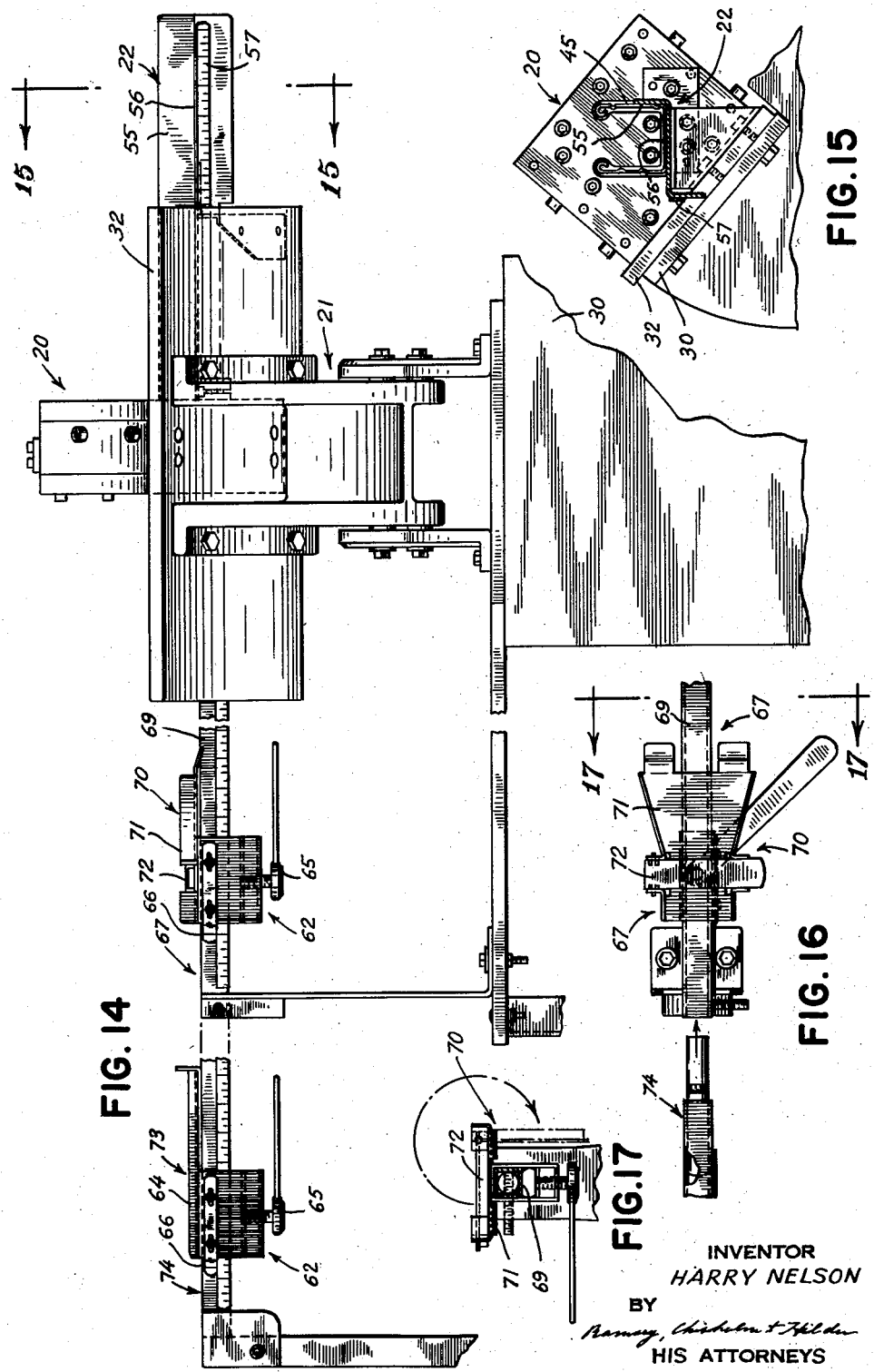
INVENTOR
HARRY NELSON
BY
HIS ATTORNEYS Patented July 7, 1953

2,644,520

UNITED STATES PATENT OFFICE 2,644,520

LENGTH CUTTING MACHINE

Harry Nelson, New York, N. Y., assignor to Lorentzen Hardware Mf'g. Corp., New York, N. Y., a corporation of New York Application December 9, 1949, Serial No. 132,139

2 Claims. (Cl. 164—40)

This invention relates to machines for the cutting of sheet metal and more particularly to a machine for cutting light gauge channel shapes to predetermined length.

In the manufacture of Venetian blinds, the bars and slats for the blind are cut to desired length from strips of indeterminate length. The present invention is directed to a machine for quickly and easily severing to predetermined length light gauge sheet metal channels such as are used for Venetian blind headbars and bottom bars without crushing the channels or otherwise distorting their cross section.

In the form shown of the present invention, a pair of shearing dies comprising a fixed die or shear and a movable die or shear are mounted in a power press. The dies are provided with initially-alined openings corresponding with the cross section of the channel to be cut so as to receive the channel and support the walls of the channel against deformation during the cutting operation. Upon actuation of the press, the movable die or shear is forced downwardly so as to move its opening out of alinement with the opening of the fixed die and sever the channel inserted within the dies. The direction of movement of the movable die or shear is non-parallel to any of the walls of the channel; and this effects the cut with a very short stroke and gives maximum support to the walls of the channel during the cutting operation.

Linear scales, and adjustable stops movable along the scales, are provided for aiding in the rapid cutting of the channel stock to predetermined desired lengths, the scales and stops being mounted on work supports extending from both sides of the dies and supporting the channel in alinement within the dies. The work support at one side of the dies may be extended for the cutting of longer channels, the original movable stop becoming a work guide and a second or substitute stop being adjustable along the extended portion of the scale.

An object of the present invention is to provide improved shearing dies for the severing of channel-shaped sheet metal Venetian blind head and bottom bars from lengths of channel-shaped stock.

Another object of the invention is to provide shearing dies for channel-shaped sheet metal Venetian blind head and bottom bars in which the cutting travel of the shear is reduced to a minimum and the channel is given maximum support against deformation.

Another object of the invention is to facilitate the feeding of the channel stock through the shearing dies preparatory to cutting.

Another object of the invention is to provide a Venetian blind headbar and bottom bar cutting machine having an improved work supporting guide and stops for the severing of channel-shaped stock in predetermined lengths.

Another object of the invention is to generally improve machines for the severing of suitable channel-shaped sheet metal stock for use as Venetian blind headbars and bottom bars.

Further objects and objects relating to details and economies of construction and operation will more definitely appear from the detailed description to follow.

My invention is clearly defined in the appended claims. In the claims, as well as in the description, parts are at times identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification, in which:

Fig. 8 is a left side elevation corresponding to Fig. 2 of a second form of die for similarly cutting Venetian blind bottom bars.

Fig. 9 is a right side elevation of the dies shown in Fig. 8.

Fig. 10 shows the dies of Fig. 8 when viewed from the direction of the arrow 10 in Fig. 8.

Fig. 11 is a vertical section taken on the line 11, 11 of Fig. 10, the die shoe or base being shown in horizontal position to correlate this figure with Fig. 10.

Figure 12 is a vertical section of the dies taken on the line 12, 12 of Fig. 10, this figure being correlated with Fig. 10 similarly to Fig. 11.

Fig. 13 is a top plan view of the dies shown in Figs. 8-12 when positioned as shown in Figs. 11 and 12.

Fig. 14 is a somewhat diagrammatic fragmentary front elevation of a portion of the cutting machine, showing portions of the press, the cut-off dies and the headbar supports with their adjustable stops. Portions of the headbar supports have been broken out to condense the view.

Fig. 15 is a fragmentary vertical section taken on the line 15, 15 of Fig. 14, portions of the press being omitted.

Fig. 16 is a top plan view of a portion of the left-hand headbar support shown in Fig. 14 and the adjustable stop therefor.

Fig. 17 is a vertical section taken on the line 17, 17 of Fig. 16, showing the stop of Fig. 16 in end elevation.

Figure 1:
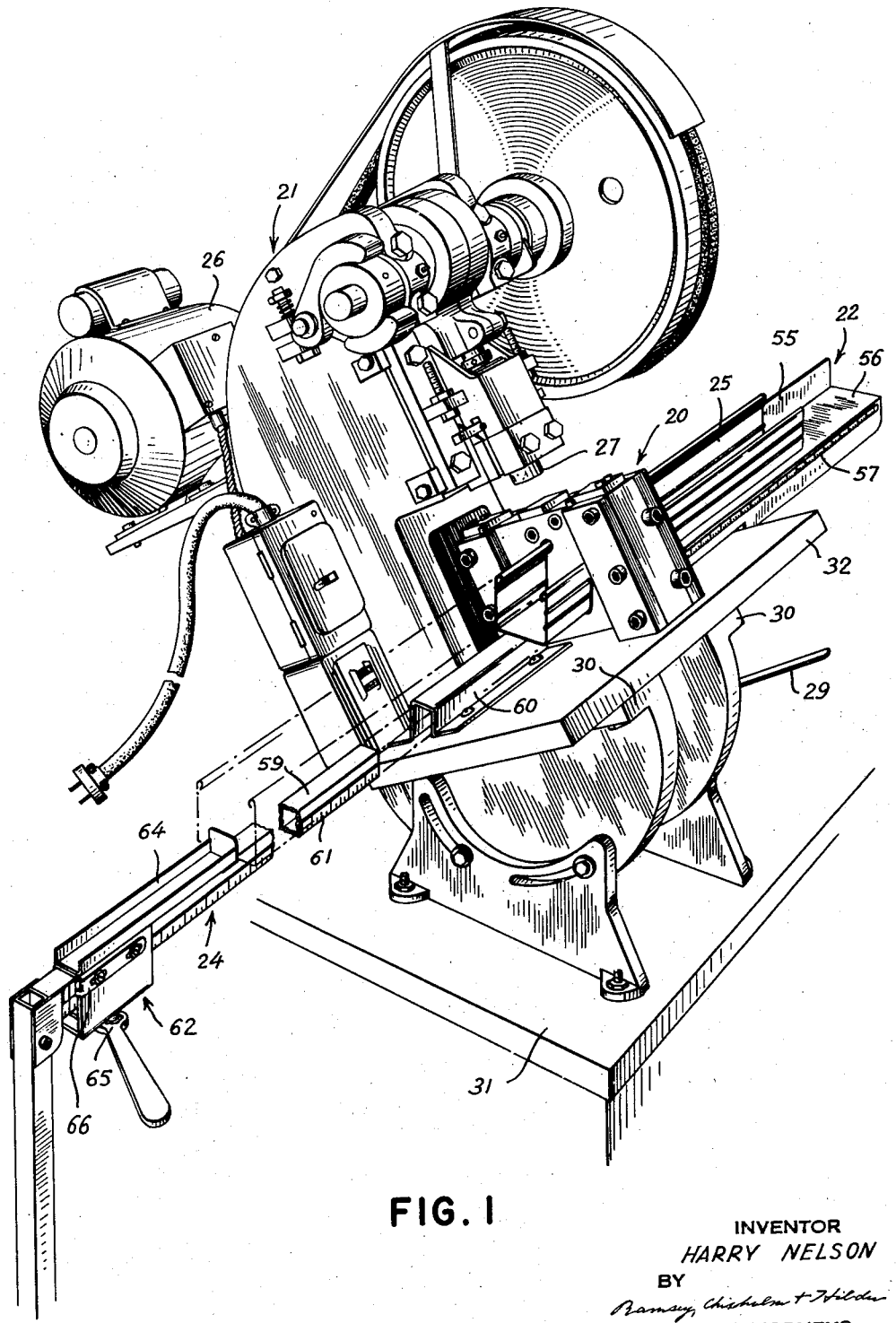
Fig. 1 is a perspective view of a machine for cutting Venetian blind headbars to length, a portion of the left-hand headbar support being broken out to condense the illustration and a headbar being shown inserted within the shearing dies.

Referring now to Fig. 1, the machine there shown broadly comprises shearing dies 20, a mechanical press 21 for supporting and operating the dies, and work supports 22 and 24 extending to the right and left respectively of the shearing dies. A channel-shaped sheet metal Venetian blind headbar 25 is shown inserted within the shearing dies 20 and supported by the work supports 22 and 24.

The press 21 is of a conventional type powered by an electric motor 26. The press may be of a design having an adjustable frame so that the direction of travel of the ram 27 of the press lies in a vertical plane but is at an angle to the vertical in order to maintain the work in an erect position, as will be explained. A trip lever 29, upon each actuation thereof, operates the press to cause the ram 27 to be forced downwardly towards the bed 30 of the press and returned to the raised position shown in Fig. 1. Each such stroke or cycle of the press 21 actuates the shearing dies to complete a single cut and return. The press 21 may be mounted on any suitable table-like support 31. I have found that for the purpose here contemplated, a press having a rated capacity of five tons is adequate.

A die shoe 32, formed of a flat, rectangular steel plate, is mounted on the press bed 30, and the dies 20 are mounted on the top surface of the die shoe.

Figure 2:
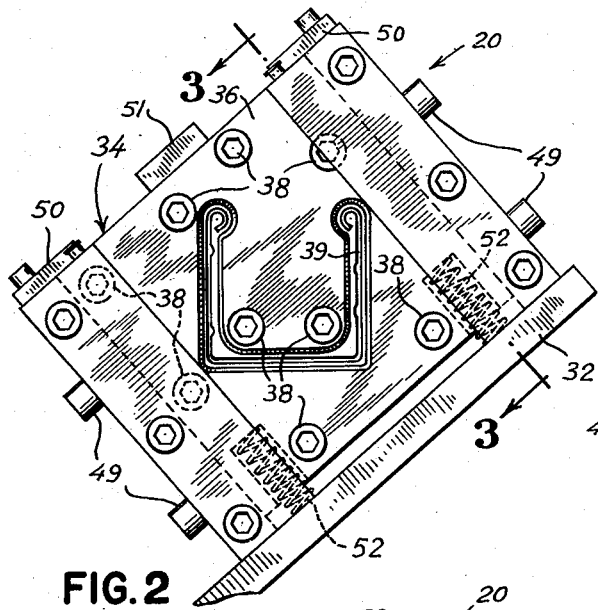
Fig. 2 is a left side elevation of the shearing dies of the machine shown in Fig. 1, the die shoe or base being shown in vertical section.
Figure 3:
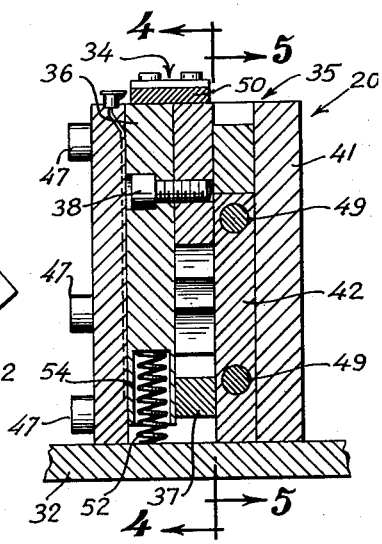
Fig. 3 is an oblique section of the shearing dies, taken on the line 3, 3 of Fig. 2.
Figures 4, 5:
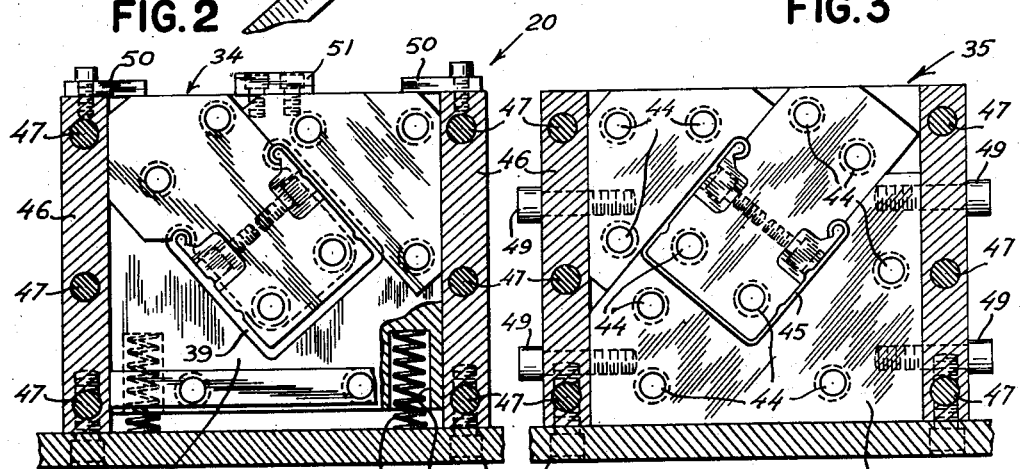
Fig. 4 is a vertical section of the dies taken general on the line 4, 4 of Fig. 3, the die shoe or base being shown in horizontal position to correlate this figure with Fig. 3.
Fig. 5 is a vertical section of the dies taken on the line 5, 5 of Fig. 3, this figure being correlated with Fig. 3 similarly to Fig. 4.

The shearing dies 20 for operation by the press 21 are shown in the oblique position in which they are mounted in the press in Figs. 2 and 15 and in level position (for convenience of illustration) in Figs. 3 through 6. These dies comprise a movable shearing die 34 and a cooperating fixed (not moved to sever the material) shearing die 35.

The movable die 34 includes a flat steel mounting plate 36 of rectangular outline and uniform thickness. A plurality of interfitting alloy steel parts of uniform thickness collectively designated as 37, are mounted on one side of the movable die mounting plate 36 and form a cutting face for the movable die. The parts 37 are retained in position on the mounting plate 36 by cap screws 38 threadedly engaged in parts 37 and having their heads countersunk in the opposite side of the mounting plate.

The movable die 34 is provided with a slot 39 extending through both the mounting plate 36 and the punch cutting face formed by the parts 37. The slot 39 corresponds with the cross-sectional area of the headbar channel 25 which is to be cut, but is slightly larger in order to provide sufficient clearance to receive the channel. The portion of the slot 39 in the mounting plate 36 is somewhat larger than the corresponding slot in the cutting face formed by the parts 37. This is partly for convenience in machining the slot in the mounting plate and partly due to the fact that there must be only a slight clearance between the channel and the cutting face to avoid excessive deformation of the headbar channel during the cutting operation. The relative clearances of the several portions of the punch and die will be considered in detail after the description of the dies has otherwise been completed.

The cooperating fixed die 35 is constructed generally similar to the movable die 34. This die comprises a mounting plate 41 rectangular in outline and of uniform thickness. A series of alloy steel parts collectively designated as 42 are secured to one side of the mounting plate 41 and form a cutting face therefor. Parts 42 are retained in position on the mounting plate 41 by a series of cap screws 44 threadedly engaged in the parts and having their heads countersunk on the opposite side of the mounting plate.

A slot 45 is formed in the mounting plate 41 and the die cutting face formed by the parts 42, this slot also conforming with the cross section of the channel 35 to be cut. Here again, the clearance between the slot and the headbar channel in the mounting plate is greater than the clearance in the cutting face, clearance being discussed in more detail hereinafter.

In the die assembly 20, the movable die 34 is mounted against and for straight line reciprocatory movement on the fixed die 35, the cutting face of the movable die being positioned against the cutting face of the fixed die. The movable die 34 is so supported by guides 46, 46 secured to two opposite side edges of the die mounting plate 41 and extending beside the die 35, these guides also overlapping for a short distance the rear side of the movable die mounting plate 36 as indicated in Figs. 2 and 6 to retain the movable die against the fixed die.

Figure 6:
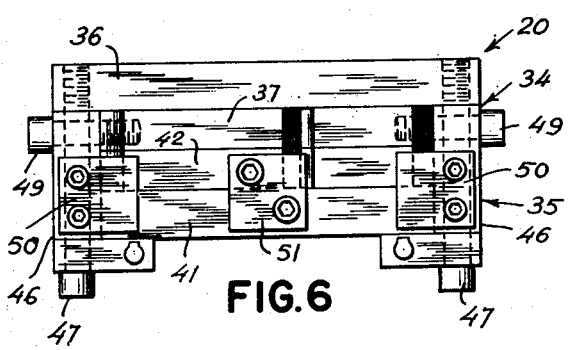
Fig. 6 is a top plan view of the dies when positioned as shown in Figs. 4 and 5.

The guides 46, 46 may be formed of two pieces as indicated in Fig. 6 and are held in position on the fixed die 35 by a series of cap screws 47 and 49 threadedly engaged in the die mounting plate 41 and certain of the parts 42 comprising the die cutting face. Stops 50, 50 projecting above the movable die 34 limit its upward movement, these stops being mounted at the top of the guides 46, 46. In addition, a plate 51 may be mounted in a central position on top of the movable die 34 to receive the ram 27 of the press in actuating the die in its cutting stroke.

The die 35 and guides 46, 46 are secured on the top surface of the die shoe 32, the die shoe limiting downward movement of the movable die 34. To bias the movable die 34 to raised position against the stops 50, 50, a pair of helical springs 52, 52 are partly contained within bores 54, 54 formed in the bottom edge of the movable die mounting plate 36 and bear against the top surface of the die shoe 32.

When the movable die 34 is in raised position against the stops 50, 50, the slot 39 of the die 34 and the slot 45 of the die 35 register or coincide so that the headbar 25 may be inserted through the dies. Upon actuation of the trip lever 29 of the press 21, the ram 27 descends so as to force the movable die 34 downwardly toward the die shoe 32 and move the slots 39 and 45 out of coincidence so as to shear the headbar along the plane of the cutting surfaces of the movable and fixed dies 34 and 35.

In order to effect the cutting operation as quickly as possible and with as short a stroke as possible, as well as to give maximum support to the walls of the headbar 25 on each side of the cut so as to avoid deforming the headbar, the movable die is moved in a direction not parallel to any of the walls of the generally rectangular headbar. This is accomplished by relatively rotating the slots 39 and 45 clockwise as viewed in Fig. 2 from the vertical axis of the dies 20 as defined by the guides 46, 46, an angle of about 35° having been determined as that which will permit an extremely short cutting travel of the movable die 34 and at the same time support the walls of the headbar 25 to a maximum during the cutting operation. However, in order to retain the bottom wall of the headbar 25 in a horizontal position during the cutting operation, the die shoe 32 is mounted at an angle of approximately 35° counterclockwise from the horizontal as viewed from the left of Fig. 1 in order to rotate the slots 39 and 45 of the dies back into channel upright position. To accomplish this, the entire press 21 may be inclined rearwardly on its base a similar amount, as indicated in Fig. 1, the ram 27 being likewise inclined.

Figure 7:
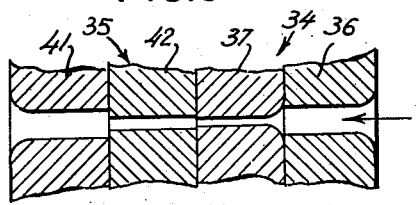
Fig. 7 is a diagrammatic cross section showing the relationship of the channel-receiving openings in the various parts of the dies.

Referring now to Fig. 7, showing diagrammatically the channel-receiving openings of the various parts of the dies 20, it will be noted that the slot 45 in the fixed die 35 is broadest in the mounting plate 41, the entering side of the slot being broadened by an appropriate radius to facilitate insertion of a channel and the remainder of the slot having parallel walls. The extension of the slot 45 formed by the parts 42 of the cutting face is similarly formed but smaller in width, the initial radius or transition portion of the slot extending out to the parallel sides of the slot within the mounting plate 41 and the parallel portion of the slot being only sufficiently wide to receive the channel 25 with a reasonable clearance to provide for minor irregularities of the channel.

The registering slot 39 of the movable die 34 defined by the parts 37 of the die cutting face are slightly wider to assure easy passage of the headbar 25 through the dies, the slots 45 and 39 both having a sharp shearing edge at the shearing plane. The slot 39 in the movable die mounting plate 36 is somewhat larger than in the cutting face 42 and may terminate in a suitable transition radius at the outside of the dies. This construction facilitates the insertion of an end of the headbar 25 through the dies 20, even though the end of the headbar has become somewhat bent or burred, and at the same time provides support for the headbar walls on each side of the shearing plane during cutting. Forming the movable and fixed die cutting faces of separate interfitting parts facilitates machining of the slots 39 and 45 for reception of the headbar 25 and permits the replacement of any individual part which may become worn or broken in operation, and at the same time facilitates sharpening of the dies. Forming and sharpening of the dies is also facilitated in that the walls of the channel-receiving slots 39 and 45 are perpendicular to the faces of the dies, transition of the cross-sections of the slots being obtained by the use of rounded transition sections. The dies are sharpened by grinding the contacting portions of the dies along the shearing plane. Since the walls of the slots in the dies are parallel, grinding this surface in sharpening the dies does not increase the width of the slot opening in the dies, which width must be held very closely in order to support the channel against deformation during cutting.

The die shoe 32 extends outwardly on each side of the dies 20. On the right or headbar-entering side of the dies, the work support 22 is secured, extending from the top surface of the die shoe 32 in a horizontal plane for supporting the headbar channel 25. The work support 22 has a raised or vertical rear flange 55 and a horizontal flange 56, the work support forming a track or guide for the channel 25 alined with the slot 45 in the fixed die mounting plate 41. A scale 57 may be secured along the forward edge of the horizontal flange 56 to indicate linear distance from the shearing plane of the dies 20.

The work support 24 extending from the opposide side of the dies 20 may include a rectangular hollow metal rod 59 having a horizontal top surface. The work support 24 is mounted on the die shoe 32 with its top surface a short distance below the slot 39 in the movable die mounting plate 36 by means of a suitable plate 60 secured to the die shoe to provide for downward movement of the severed portion of the headbar with movable die 34. A scale 61 is secured along the front surface of the work support 24 to indicate distance of a stop member 62 from the shearing plane of the dies 20.

The stop member 62 comprises a sleeve mounted for movement along the rod 59 of the work support 24 and has a stop portion 64 positioned on the top surface of the rod 50 and engageable by the forward end of the headbar 25 to serve as a stop facilitating the cutting of one or more headbar sections of a predetermined length. The stop member 62 may be clamped in any position along the rod 59 by a simple lever-operated screw 65 which may be tightened against the underside of the rod 59. A suitable indicator 66 is mounted on the stop member 62 to register with the scale 61 in the setting of the stop member. The upper or stop portion 64 of the stop member 62 projects forwardly (towards the dies) of the remainder of the member so as to overlie the die shoe 32 when extremely short sections of headbar are to be cut.

While it is anticipated that most lengths of Venetian blind headbar to be cut will be indicated and determined by the scale and stop member on the left-hand work support 24, it is anticipated that at times it may be convenient to use the scale 57 of the right hand work support 22 such as to measure the final cut from a length of channel stock.

It is anticipated that at times it may be desirable to cut sections of headbar of longer than usual length. Hence, the alternative or substitute left-hand work support 67 indicated in Figs. 14, 16 and 17 may be employed instead of the work support 24 of Fig. 1. The work support 67 comprises a first section 69 generally similar to the work support 24 previously described and having a movable stop member 70 which may be clamped at any position along this section of the support. The upper portion of this stop member is provided with a combination work guide and stop 71, the work guide portion having diverging side and bottom walls extending towards the dies 20 to receive the end of the headbar. A pivotally-mounted stop element 72 on the work guide 71 forms a stop to be engaged by the end of the headbar 25.

For cutting headbar sections longer than that permitted by the first section 69, a second section 74 may be telescopically coupled to the first section in order to extend it farther to the left. This second section is provided with a stop member 73 similar to the stop member 62 first described and is also provided with a suitable scale graduated as an extension of the scale of the first section. When using the second section 74 in the cutting of long headbars, the stop member 72 of the work guide 71 is rotated to the position indicated in dot-dash lines in Fig. 17 so as to remove it from the path of the headbar 25, the work guide 71 then serving only to support the headbar 25 in alinement on the work support.

The equipment above described for the cutting of headbars is made equally suitable for the cutting of channel-shaped metal Venetian blind bottom bars by replacing the dies 20 by the generally similar dies 75 shown in Figs. 8 through 13, inclusive. The dies 75 likewise include a movable die 76 and a fixed die 77, the dies being mounted on a die shoe 78.

The movable die 76 is formed of a die mounting plate 79 to which is secured a series of interfitting parts collectively designated as 80 and forming the cutting face of the die. The fixed die 77 is likewise formed of a die mounting plate 81 to which are secured interfitting parts collectively designated as 82 and forming the cutting face of the fixed die.

Guides 84, 84 secured to opposite edges of the fixed die mounting plate 81 support the movable die 76, while stops 85, 85 mounted at the top of the guides 84, 84 limit the upward movement of the movable die 76. A plate 86 mounted at the top of the movable die 76, and similar to the plate 51 of dies 20, receives the ram 27 of the press for actuating the die.

Helical springs 87, 87 bias the punch upwardly against the stops 85, in which position a slot 89 formed in the punch 76 coincides with a slot 90 formed in the die 77. The slots 89 and 90 conform to cross section of a bottom bar channel to be cut.

The construction and operation of the bottom bar dies 75 is essentially the same in all respects as the headbar dies 20 above described. Here again, it has been found that for most favorable cutting, the slots within the dies 75 for receiving the bottom bar should be relatively rotated through an angle of 35° from the vertical axis of the punch as defined by the guides 84, 84.

The shearing dies of the present invention operate with a very short cutting travel since it is only necessary to move the slot of the movable die out of registry with the slot of the fixed die and this necessary movement is minimized by arranging the dies so that movement is in a direction non-parallel to any wall of the section being cut. Accordingly, the cut is accomplished very rapidly and the dies may readily be incorporated in a so-called "flying shears" in which moving stock is severed by dies temporarily moving with the stock. Stock moving at rates up to 250 feet per minute may be severed by dies of this type without excessive travel of the dies with the stock.

I claim:

1. Shearing dies for cutting sheet metal channels of generally rectangular cross section, said dies comprising: two relatively movable dies, each having a channel-shaped slot therethrough corresponding in shape with the cross section of the channel to be cut, each of said dies comprising a plurality of interfitting parts forming a cutting face, the parts of each cutting face being individually secured to one side of a flat mounting plate which is slotted similarly to and correspondingly with the slot in the cutting face, one die being mounted for sliding movement on the other die in a direction at an angle to each of the sides of said channel-shaped slot, the opposite walls of the slots through both cutting faces and both mounting plates being parallel throughout the major portions thereof which are nearest to the shearing plane, the width of the slots being greater in the mounting plates than in the cutting faces, the slot through the cutting face on that die into which the sheet metal channel is first entered being narrower than the slot through the cutting face of the other die, and the slot through the cutting face of that die into which the sheet metal channel is first entered having a tapered mouth which decreases from a size at least as large as the parallel wall portion of the slot through the mounting plate to the size of the parallel wall portion of such slot through the cutting face.

2. Shearing dies as claimed in claim 1, in which one die moves on the other die along a straight line at an angle approximately 35° to the planes of that portion of the slots which receive the side walls of the channel.

HARRY NELSON.

References Cited in the file of this patent

UNITED STATES PATENTS

| Number | Name | Date |
|---|---|---|
| 983,585 | Wachter | Feb. 7, 1911 |
| 1,160,885 | Hart | Nov. 16, 1915 |
| 1,195,249 | Matthews | Aug. 22, 1916 |
| 1,336,589 | Schmidt et al. | Apr. 13, 1920 |
| 1,715,138 | Lothrop | May 28, 1929 |
| 1,715,612 | McNeil | June 18, 1929 |

FOREIGN PATENTS

| Number | Country | Date |
|---|---|---|
| 26,151 | Switzerland | Apr. 28, 1902 |
| 594,905 | France | Sept. 23, 1925 |
| 683,454 | France | June 12, 1930 |
| 579,067 | Great Britain | July 22, 1946 |